United States Patent
Li et al.

(10) Patent No.: US 12,374,896 B1
(45) Date of Patent: Jul. 29, 2025

(54) PASSIVITY-BASED DUAL-MODE INTEGRATED CONTROL METHOD FOR GRID-CONNECTED INVERTER

(71) Applicant: HEFEI UNIVERSITY OF TECHNOLOGY, Hefei (CN)

(72) Inventors: Ming Li, Hefei (CN); Yongtao Mao, Hefei (CN); Enjun Liu, Hefei (CN); Xing Wang, Hefei (CN); Xing Zhang, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 19/069,290

(22) Filed: Mar. 4, 2025

(30) Foreign Application Priority Data

Jul. 9, 2024 (CN) .......................... 202410917870.9

(51) Int. Cl.
*H02J 3/38* (2006.01)
*H02M 7/48* (2007.01)
(Continued)

(52) U.S. Cl.
CPC .................. *H02J 3/38* (2013.01); *H02M 7/48* (2013.01); *H02M 7/53871* (2013.01);
(Continued)

(58) Field of Classification Search
CPC ...... H02J 3/38; H02J 2203/10; H02J 2203/20; H02M 7/53871; H02M 7/5395
See application file for complete search history.

(56) References Cited

U.S. PATENT DOCUMENTS 12,107,509 B1 * 10/2024 Mohammed ........ H02M 7/2173
12,149,184 B1 * 11/2024 Zhang ................ H02M 7/53873
(Continued)

FOREIGN PATENT DOCUMENTS

CN      106253646 A    12/2016
CN      107093909 A     8/2017
(Continued)

OTHER PUBLICATIONS

Ming Li, et al., Robust Passivity-Based Control for Grid-Forming Converter, IEEE 6th International Electrical and Energy Conference(CIEEC), 2023, pp. 2603-2608.

*Primary Examiner* — Yusef A Ahmed
(74) *Attorney, Agent, or Firm* — Bayramoglu Law Offices LLC

(57) ABSTRACT

A passivity-based dual-mode integrated control method for a grid-connected inverter (GCI) is provided. In view of the insufficient robustness of the conventional single-mode GCI in a high-impedance and low-inertia weak grid, and the problem of wideband oscillation of the grid voltage and grid current or even system instability in nonlinear application scenarios such as grid structure/parameter variation, and plug-and-play of the inverter, the dual-mode integrated control method performs modeling on the GCI based on a port-controlled Hamiltonian (PCH) model, thereby obtaining integrated control with a weighted passivity-based feedback control law for the GCI based on a grid-following (GFL) mode and a grid-forming (GFM) mode. Based on the dual-mode integrated control method, the stable operation of the GCI in severe grid conditions with large fluctuation of the impedance, and desirable robustness of the GCI in nonlinear working scenarios can be ensured.

1 Claim, 8 Drawing Sheets

(51) Int. Cl.
*H02M 7/5387* (2007.01)
*H02M 7/539* (2006.01)
*H02M 7/5395* (2006.01)

(52) U.S. Cl.
CPC ....... *H02M 7/5395* (2013.01); *H02J 2203/10* (2020.01); *H02J 2203/20* (2020.01)

(56) References Cited

U.S. PATENT DOCUMENTS

| | | | |
|---|---|---|---|
| 12,206,339 B1* | 1/2025 | Zhang | H02J 3/50 |
| 2017/0047862 A1* | 2/2017 | Luo | H02M 7/53871 |
| 2019/0109461 A1* | 4/2019 | Khajehoddin | H02M 1/42 |
| 2019/0288611 A1* | 9/2019 | Li | H02M 1/126 |
| 2021/0249862 A1* | 8/2021 | Awal | H02J 3/38 |
| 2022/0077688 A1* | 3/2022 | Patarroyo | H02J 3/46 |
| 2022/0320865 A1* | 10/2022 | Zhang | G05B 19/042 |
| 2022/0352726 A1* | 11/2022 | Zhang | H02J 3/48 |
| 2023/0378880 A1* | 11/2023 | Kucka | H02M 3/33584 |
| 2024/0072698 A1* | 2/2024 | Basak | H02J 3/40 |
| 2024/0348153 A1* | 10/2024 | Morales Munoz | H02M 1/126 |
| 2025/0096565 A1* | 3/2025 | Li | H02J 3/381 |
| 2025/0096575 A1* | 3/2025 | Duan | H02J 3/38 |

FOREIGN PATENT DOCUMENTS

| | | |
|---|---|---|
| CN | 110021959 A | 7/2019 |
| CN | 114865711 A | 8/2022 |
| CN | 114884125 A | 8/2022 |
| CN | 115882514 B | 5/2023 |

\* cited by examiner

PASSIVITY-BASED DUAL-MODE INTEGRATED CONTROL METHOD FOR GRID-CONNECTED INVERTER

CROSS REFERENCE TO THE RELATED APPLICATIONS

This application is based upon and claims priority to Chinese Patent Application No. 202410917870.9, filed on Jul. 9, 2024, the entire contents of which are incorporated herein by reference.

TECHNICAL FIELD

The present disclosure relates to the field of electrical engineering, and in particular to a passivity-based dual-mode integrated control method for a grid-connected inverter (GCI).

BACKGROUND

With an ever-increasing penetration rate of power electronic devices in the grid, uncertain and random large fluctuations of the grid impedance are caused to pose a huge potential threat to the security and stability of the grid. The existing grid shows characteristics of low inertia and high impedance of the weak grid, such that the originally reliable grid-following (GFL) inverter has obvious wideband oscillation, insufficient active support for the grid and the like to seriously jeopardized stable operation of renewable energy power generation systems. For example:

1) The Chinese Patent Application CN 107093909 A authorized on Aug. 25, 2017, provides a virtual admittance method for improving the stability of a GCI in a weak grid. According to the virtual admittance method for improving the stability of a GCI in the weak grid, when the grid impedance is greater than the first grid impedance, the grid-connected system becomes unstable. By connecting a virtual admittance to a control loop, and making the virtual admittance adjusted adaptively according to the grid impedance, the stability of the GCI is ensured. However, accurate identification of the grid impedance is a complex and arduous task. It is very difficult to accurately measure the grid impedance in real time.

2) The Chinese Patent Application CN 114884125 A authorized on Aug. 9, 2022, provides a high-stability control method for an LCL-type GCI in a weak grid. The high-stability control method for an LCL-type GCI in a weak grid solves the problem of instability of the common inverter in the weak grid. For an increase of the grid impedance in the weak grid and influences of small-signal disturbance on the phase-locked loop (PLL) and the LCL filter in the GCI system, with a strategy of feeding back active damping by dual grid-connected current loops of a second-order generalized integrator (SOGI), an active damping feedback function of an adaptive second-order resonant integrator is constructed. A proportional-resonant function is used as a current-loop controller. A virtual impedance of the control system is corrected. A voltage feed-forward controller is designed. A sequence-dividing PLL based on a biquadratic adaptive filter is designed. According to the solution, although the unstable factor caused by negative impedance in the weak grid is corrected through the virtual impedance, the coupling between the PLL and the grid impedance in the weak grid still remains to cause instability risk.

3) The Chinese Patent Application CN 106253646 A authorized on Dec. 21, 2016, provides an LCL filter parameter design method for improving the adaptability of a GCI in a weak grid. According to the LCL filter parameter design method for improving the adaptability of a GCI in the weak grid, the delay time of the control process is calculated. The open-loop transfer function is obtained according to the current control loop. The stability domain of the system resonance frequency is obtained based on a generalized Nyquist stability criterion. Compared with the original trial-and-error method with cumbersome parameters, the solution has a simple calculation. Nevertheless, the solution is still limited for a fluctuation range of the grid impedance, and cannot be applied to application scenarios where the grid impedance has fluctuated in a larger range.

In the face of novel grid environments where a large number of renewable energy power generation devices are connected and a large number of power electronic devices are used, with a view to the nonlinearity of the inverter, particularly when the inverter is applied to nonlinear application scenarios with grid structure/parameter variations such as plug-and-play and free switching, the conventional single-mode GCI is not sufficiently adaptable to cause wideband oscillation and other stability problems. Given this, dual-mode integrated control based on GFL/grid-forming (GFM) is proposed by scholars. For example:

1) The Chinese Patent Application CN 110021959 A authorized on Aug. 28, 2020, provides a short circuit ratio (SCR)-based dual-mode control method for a GCI in a weak grid. According to the SCR-based dual-mode control method for a GCI in the weak grid, the problem that the state of the weak grid obtained through impedance identification by the multi-inverter system in a current-source mode in the weak grid is not intuitive enough and not clear enough, the SCR is proposed to represent the state of the weak grid, thereby switching the GFL mode and the GFM mode to ensure stability of the inverter system. However, regardless of the impedance identification or the solution in which the state of the weak grid is obtained based on the SCR, accurate detection and accurate calculation are indispensable. Real-time accurate measurement and real-time accurate mode switching are achieved hardly.

2) The Chinese Patent Application CN 114865711 A authorized on Aug. 5, 2022, provides a dual-mode switching control method for a renewable energy GCI and a system. According to the dual-mode switching control method for a renewable energy GCI and the system, the inverter is operated in a self-synchronizing control mode in response to the stable operating condition, and is switched to an alternating current (AC) voltage-fixed control mode in response to the voltage sag. The method provides reactive compensation for the system to achieve desirable low-voltage ride-through (LVRT) capability. The method realizes automatic switching through a depth of the voltage sag of the grid connection point, thereby shortening switching time. However, the method switches the mode only in the voltage sag, and provides neither reasonable detection indexes nor switching for other working conditions. Hence, the dual-mode switching in the method is limited to some extent.

3) The Chinese Patent Application CN 115882514 B authorized on May 9, 2023, provides a GFL-GFM integrated and inverter cluster integrated control method for a renewable energy power system. The GFL-GFM integrated and inverter cluster integrated control method for a renewable energy power system includes: According to the power characteristics of a synchronous generator, a response curve for output powers of the synchronous generator is obtained. Output powers of power generating units of a distributed energy system are equivalently replaced, such that response characteristics of the output powers are equivalent to a virtual synchronous generator, and a swing equation of the virtual synchronous generator is obtained. A power curve is constructed and a power instruction is distributed. A local GFL-GFM integrated control method is constructed. A distribution coefficient of the power instruction in the GFL-GFM integrated control method is designed. The method performs integrated control of all power-generating units, and constructs the integrated control method based on the conventional GFM and GFL control strategies. The method is a station-level multi-mode optimal configuration solution, but is defective for the relatively complex technology, intricate model structure, and hard implementation.

Directly starting from characteristics of energy dissipation of the system, the passivity theory is intended to design a control link of the controller. The passivity theory points out that a new system obtained after the parallel connection of multiple passive subsystems will maintain its passivity. Modeling based on the theory can be adapted to the complex higher-order systems. Therefore, the passivity-based controller provides an effective solution for the grid-connected control of the renewable energy generation system with a high penetration rate. For example:

1) According to "*Robust Passivity-Based Control for Grid-Forming Converter*" issued by M. Li, H. Geng, and X. Zhang at the 2023 IEEE 6th International Electrical and Energy Conference (CIEEC), the nonlinear control delay of the passivity-based controller in practical applications may lead to the risk of insufficient stability margin or even instability of the grid-connected inverter. In this paper, the D-partition method is used to introduce nonlinear control delay, and a robust passivity-based control (PBC) method for the GFM inverter is provided. However, the paper aims at the design solution on the passivity control law for controlling the AC output voltage, and exhibits the characteristics of a voltage source externally. The external characteristic in the present disclosure is the current source characteristic. The paper focuses on the design and analysis of the controller of the GFM GCI in the weak grid. In the face of the strong fluctuation and randomness of the grid, the dynamic performance and response speed are still insufficient.

In conclusion, there have been the following problems in the prior art:

1) The GCI based on the conventional GFL mode cannot operate stably in the high-impedance and low-inertia weak grid after a large scale of renewable energy connections. Particularly in the renewable energy power generation system, as the line impedance is increased greatly for long-distance transmission, the grid strength is reduced gradually, resulting in wideband oscillation of the grid voltage and grid current of the conventional PLL-based GFL inverter.

2) According to research of existing literature on the GFL/GFM switched hybrid control, the grid strength is obtained according to the grid impedance identification link, thereby switching the operating mode in the weak grid and the strong grid. However, the impedance identification technology is not yet mature, with certain technical difficulties in engineering applications.

3) For existing GFL/GFM integrated or switched hybrid control based on the conventional linear architecture such as the proportional-integral (PI) controller, in case of nonlinear working conditions such as plug-and-play of the inverter, random and uncertain fluctuation of the grid impedance, fluctuation of line and device parameters in the high-impedance and low-inertia weak grid, the accurate response is unachievable and the dynamic response capability is insufficient. This is particularly prone to unpredictable wideband oscillation, or even instability risk.

SUMMARY

A technical problem to be solved by the present disclosure is to overcome a limitation of real-time grid impedance sensing of the original dual-mode switching technical solution. Given the characteristics of high impedance and low inertia of the weak grid and disturbances of various nonlinear factors such as plug-and-play and free switching of the inverter, a control method capable of being widely adapted to the large fluctuation of the impedance and coping with a complex nonlinear working condition is desired urgently. Therefore, the present disclosure provides a passivity-based dual-mode integrated control method for a GCI.

Technical solutions of the present disclosure are as follows:

The present disclosure provides a passivity-based dual-mode integrated control method for a GCI, where a topology of the GCI includes a direct current (DC) power supply, a main inverter, an LCL filter, an equivalent line inductor, and a three-phase grid that are connected serially in sequence; the LCL filter includes a bridge arm-side inductor, an equivalent resistor of the bridge arm-side inductor, a filter capacitor, and a grid-side inductor; dual-mode integrated control refers to integrated control of a GFL control mode of the GCI and a GFM control mode of the GCI; and the integrated control method includes: establishing a passivity-based feedback control law for the GFL control mode of the GCI and a passivity-based feedback control law for the GFM control mode of the GCI; and introducing a weighting coefficient n to weight the two passivity-based feedback control laws of the two control modes, thereby obtaining a dual-mode integrated passivity-based feedback control law u, specifically:

step 1: sampling an output current $i_a$, $i_b$, $i_c$ of the bridge arm-side inductor, and transforming the output current from a three-phase stationary coordinate system to a two-phase rotating coordinate system to obtain a d-axis component $i_d$ of the output current of the bridge arm-side inductor and a q-axis component $i_q$ of the output current of the bridge arm-side inductor; sampling an output voltage $u_{Ca}$, $u_{Cb}$, $u_{Cc}$ of the filter capacitor, and transforming the output voltage from the three-phase stationary coordinate system to the two-phase rotating coordinate system to obtain a d-axis component $u_{Cd}$ of the output voltage of the filter capacitor and a q-axis component $u_{Cq}$ of the output voltage of the filter capacitor; and sampling a current $i_{ga}$, $i_{gb}$, $i_{gc}$ of the three-phase grid, and transforming the current from the three-phase stationary coordinate system to the two-phase rotating coordinate system to obtain a d-axis component $i_{gd}$ of the current of the three-phase grid and a q-axis component $i_{gq}$ of the current of the three-phase grid;

step 2: acquiring a phase angle required by synchronization of the GCI and the grid, and labeling the phase angle as a synchronous phase angle $\theta$, $\theta=\int\omega dt$, where t is the operation time of the GCI, $\omega$ is a referenced angular frequency; and the referenced angular frequency $\omega$ is obtained through control of an active power-synchronization loop, and expressed by: $\omega=\omega_0+K_p(P_{ref}-P)$, where, $\omega_0$ is a rated angular frequency, $K_p$ is a coefficient of proportionality in the control of the active power-synchronization loop, $P_{ref}$ is an instruction value of a rated active power output by the GCI, and P is the rated active power output by the GCI;

step 3: establishing the passivity-based feedback control law for the GFL control mode of the GCI, and labeling the passivity-based feedback control law as a GFL passivity-based feedback control law $u_1$, $u_1=[u_{d1}\ u_{q1}]$, where, $u_{d1}$ is a d-axis modulating voltage of the GFL passivity-based feedback control law $u_1$, and $u_{q1}$ is a q-axis modulating voltage of the GFL passivity-based feedback control law $u_1$; and the GFL passivity-based feedback control law $u_1$ is solved as follows:

in a GFL operating mode, respectively labeling a given value of the d-axis component $i^*_{dL}$ and a given value of the q-axis component of the output current of the bridge arm-side inductor as $i^*_{qL}$ that are calculated by:

$$i^*_{dL} = \frac{P_{ref}}{1.5U}$$

$$i^*_{qL} = \frac{Q_{ref}}{1.5U}$$

where, $Q_{ref}$ is an instruction value of a rated reactive power output by the GCI, and U is an effective value of a voltage of the three-phase grid; and based on an interconnection and damping assignment passivity-based control (IDA-PBC) method, expressing the GFL passivity-based feedback control law $u_1=[u_{d1}\ u_{q1}]$ by:

$$\begin{cases} u_{d1} = u_{Cd} + r_f i_d - r_{L1}(i_d - i^*_{dL}) - \omega L_1 i^*_{qL} + L_1 \frac{di^*_{dL}}{dt} \\ u_{q1} = u_{Cq} + r_f i_q - r_{L1}(i_q - i^*_{qL}) - \omega L_1 i^*_{dL} + L_1 \frac{di^*_{qL}}{dt} \end{cases}$$

where, $r_f$ is a resistance of the equivalent resistor of the bridge arm-side inductor, $r_{L1}$ is an injection damping gain of the GFL mode, and $L_1$ is an inductance of the bridge arm-side inductor;

step 4: establishing the passivity-based feedback control law for the GFM control mode of the GCI, and labeling the passivity-based feedback control law as a GFM passivity-based feedback control law $u_2$, $u_2=[u_{d2}\ u_{q2}]$, where, $u_{d2}$ is a d-axis modulating voltage of the GFM passivity-based feedback control law $u_2$, and $u_{q2}$ is a q-axis modulating voltage of the GFM passivity-based feedback control law $u_2$; and the GFM passivity-based feedback control law $u_2$ is solved as follows:

in a GFM operating mode, respectively labeling a given value of the d-axis component $i^*_{dm}$ and a given value of the q-axis component of the output current of the bridge arm-side inductor as $i^*_{qm}$ that are expressed by:

$$\begin{cases} i^*_{dm} = i_{gd} - \omega C u_{Cq} - r_{m1}(u_{Cd} - u^*_{Cd}) + C\frac{du^*_{Cd}}{dt} \\ i^*_{qm} = i_{gq} - \omega C u_{Cd} - r_{m1}(u_{Cq} - u^*_{Cq}) + C\frac{du^*_{Cq}}{dt} \end{cases}$$

where, C is the capacitance of the filter capacitor, $r_{m1}$ is a first injection damping gain of the GFM mode, and $u^*_{Cd}$, $u^*_{Cq}$ are respectively a given value of the d-axis component of the output voltage of the filter capacitor and a given value of the q-axis component of the output voltage of the filter capacitor;

based on the IDA-PBC method, expressing the GFM passivity-based feedback control law $u_2=[u_{d2}\ u_{q2}]$ by:

$$\begin{cases} u_{d2} = u^*_{Cd} - r_{m2}(i_d - i^*_{dm}) + r_f i_d - \omega L_1 i_q + L_1 \frac{di^*_{dm}}{dt} \\ u_{q2} = u^*_{Cq} - r_{m2}(i_q - i^*_{qm}) + r_f i_q - \omega L_1 i_d + L_1 \frac{di^*_{qm}}{dt} \end{cases}$$

where, $r_{m2}$ is a second injection damping gain of the GFM mode, $r_f$ is the resistance of the equivalent resistor of the bridge arm-side inductor, and $L_1$ is the inductance of the bridge arm-side inductor;

step 5: introducing the weighting coefficient n to realize weighted control on the GFL passivity-based feedback control law $u_1$ and the GFM passivity-based feedback control law $u_2$, and labeling a weighted passivity-based feedback control law as the dual-mode integrated passivity-based feedback control law u that is expressed by:

$u=nu_1+(1-n)u_2$.

Compared with the prior art, the present disclosure has the following beneficial effects:

1. The passivity-based dual-mode integrated control method for a GCI provided by the present disclosure can ensure strong robustness of the GCI in the weak grid with large fluctuation of the grid impedance. Meanwhile, from the strong grid dominated by a synchronous machine to the weak grid with a high grid impedance, the control strategy can ensure the stable operation of the GCI.

2. In the control method provided by the present disclosure, both the passivity-based feedback control law for the GFL control mode of the GCI and the passivity-based feedback control law for the GFM control mode of the GCI are established with a port-controlled Hamiltonian (PCH) model based on dissipativity and passivity theories, and the IDA-PBC method. That is, the control method provided by the present disclosure performs nonlinear modeling and control on the GCI based on the PCH model. From the perspective of energy, this is more intuitive to the design of the GCI control system. Meanwhile, the PCH model is applied to a higher-order nonlinear system, such that the design is more accurate.

3. With the massive introduction of renewable energy power generation devices and power electronic devices, the existing grid shows high impedance and low inertia. The control method provided by the present disclosure has the high grid-connected power quality and the fast power adjusting speed, while actively supporting the voltage and the frequency.

4. The control method provided by the present disclosure has better dynamic performance and stronger robustness over the conventional dual-mode integrated control based on the linear architecture. Therefore, the control method has better stability and reliability under disturbance of nonlinear factors such as nonlinear fluctuation of the parameter/structure.

5. The control method provided by the present disclosure abandons the common PLL structure of the conventional GFL mode, and obtains the phase position of the grid voltage with the power synchronization link. This prevents coupling between the grid impedance and the PLL in the weak grid, and achieves stronger resistance against the disturbance.

6. Without grid impedance identification and other grid state sensing methods, the method provided by the present disclosure ensures desirable robustness, and prevents the reduction of control performance caused by a measurement error.

DETAILED DESCRIPTION OF THE EMBODIMENTS

The technical solutions of the present disclosure will be clearly and completely described below regarding the accompanying drawings.

Figure 2:
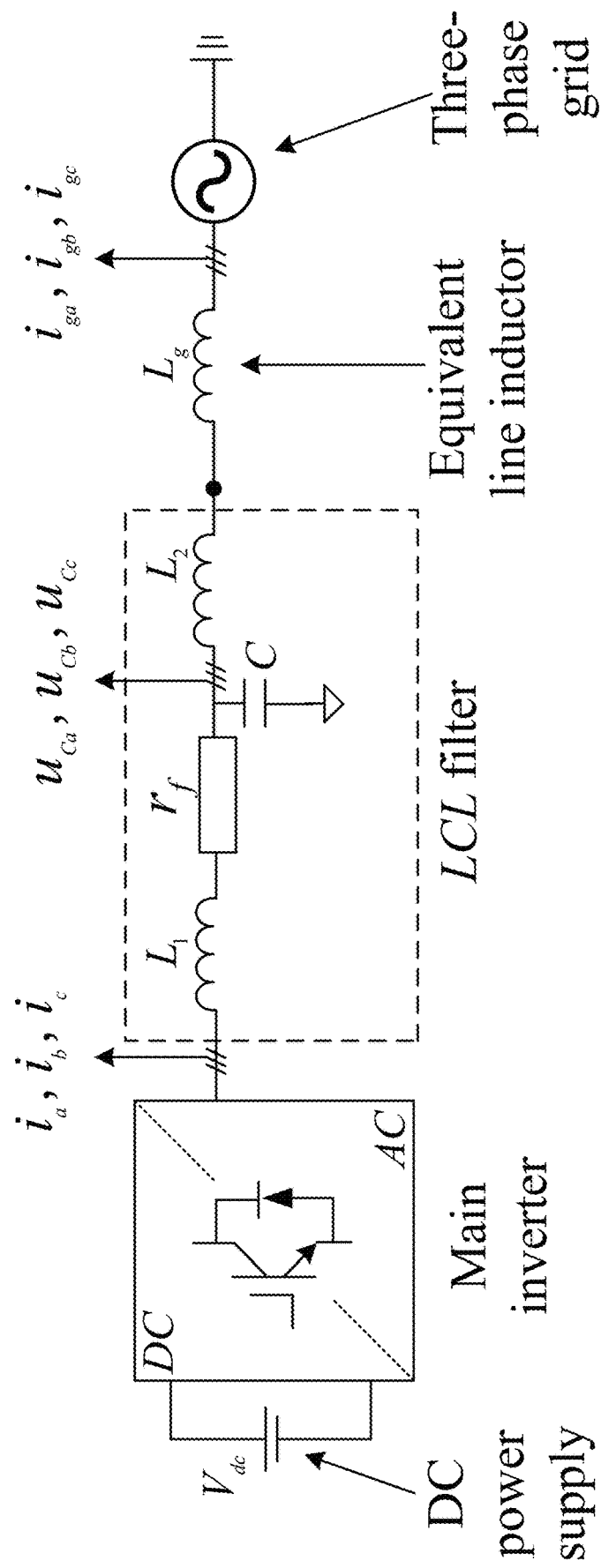
FIG. 2 illustrates a topology of a GCI according to an embodiment of the present disclosure.

FIG. 2 illustrates a topology of a GCI according to an embodiment of the present disclosure. As shown in FIG. 2, the topology of the GCI includes a DC power supply, a main inverter, an LCL filter, an equivalent line inductor, and a three-phase grid that are connected serially in sequence. The LCL filter includes a bridge arm-side inductor, an equivalent resistor of the bridge arm-side inductor, a filter capacitor, and a grid-side inductor.

In FIG. 2, $L_1$ is an inductance of the bridge arm-side inductor, $r_f$ is the resistance of the equivalent resistor of the bridge arm-side inductor, C is a capacitance of the filter capacitor, $L_2$ is an inductance of the grid-side inductor, $L_g$ is an inductance of the equivalent line inductor, and $V_{dc}$ is a voltage at the DC power supply. As an example of the present disclosure, $L_1$=0.9 mH, $r_f$=0.1Ω, C=30 μF, $L_2$=2 mH, and $V_{dc}$=800 V.

Figure 1:
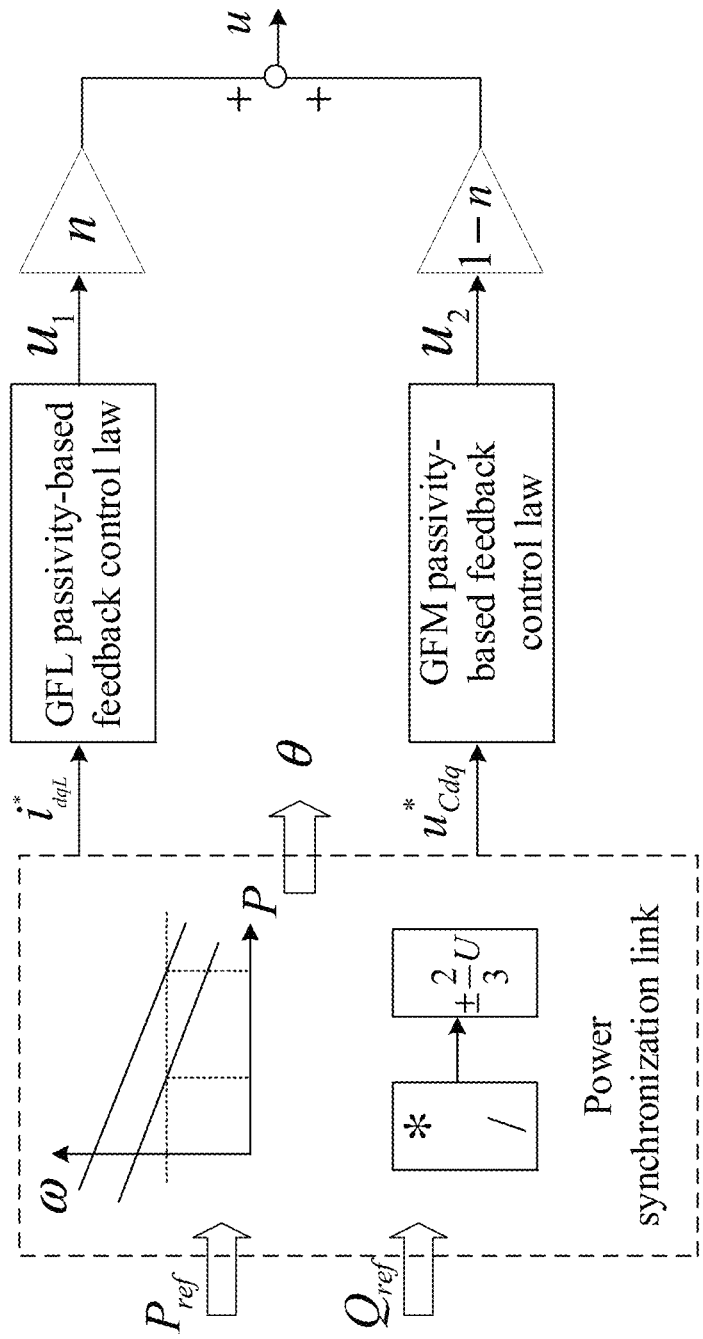
FIG. 1 is a structural view of a control structure of a dual-mode integrated control method according to the present disclosure.

FIG. 1 is a structural view of a control structure of a dual-mode integrated control method according to the present disclosure. As can be seen from FIG. 1, dual-mode integrated control refers to integrated control of a GFL control mode of the GCI and a GFM control mode of the GCI. The integrated control method includes: A passivity-based feedback control law for the GFL control mode of the GCI and a passivity-based feedback control law for the GFM control mode of the GCI are established. Weighting coefficient n is introduced to weight the two passivity-based feedback control laws of the two control modes, thereby obtaining dual-mode integrated passivity-based feedback control law u, specifically:

Step 1: Output current $i_a$, $i_b$, $i_c$ of the bridge arm-side inductor is sampled, and transformed from a three-phase stationary coordinate system to a two-phase rotating coordinate system to obtain the d-axis component $i_d$ of the output current of the bridge arm-side inductor and q-axis component $i_q$ of the output current of the bridge arm-side inductor. Output voltage $u_{Ca}$, $u_{Cb}$, $u_{Cc}$ of the filter capacitor is sampled, and transformed from the three-phase stationary coordinate system to the two-phase rotating coordinate system to obtain the d-axis component $u_{Cd}$ of the output voltage of the filter capacitor and q-axis component $u_{Cq}$ of the output voltage of the filter capacitor. Current $i_{ga}$, $i_{gb}$, $i_{gc}$ of the three-phase grid is sampled, and transformed from the three-phase stationary coordinate system to the two-phase rotating coordinate system to obtain the d-axis component $i_{gd}$ of the current of the three-phase grid and q-axis component $i_{gq}$ of the current of the three-phase grid.

Step 2: A phase angle required by synchronization of the GCI and the grid is acquired, and labeled as synchronous phase angle θ, θ=∫ωdt. In the foregoing equation, t is the operation time of the GCI, ω is a referenced angular frequency.

The referenced angular frequency ω is obtained through control of an active power-synchronization loop, and expressed by: $\omega = \omega_0 + K_p(P_{ref} - P)$. In the foregoing equation, $\omega_0$ is a rated angular frequency, $K_p$ is a coefficient of proportionality in the control of the active power-synchronization loop, $P_{ref}$ is an instruction value of a rated active power output by the GCI, and P is the rated active power output by the GCI.

In an example of the present disclosure, the coefficient $K_p$ of proportionality in the control of the active power-synchronization loop is 0.0005, and the instruction value $P_{ref}$ of the rated active power output by the GCI is set as 10,000 W.

Figure 3:
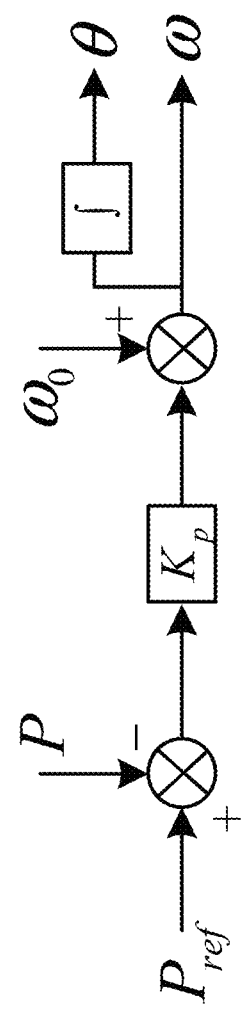
FIG. 3 is a schematic structural view of an active power-synchronization loop according to the present disclosure.

FIG. 3 is a schematic structural view of an active power-synchronization loop according to the present disclosure.

Step 3: With a PCH model based on dissipativity and passivity theories, and an IDA-PBC method, the passivity-based feedback control law for the GFL control mode of the GCI is established, and labeled as GFL passivity-based feedback control law $u_1$, $u_1 = [u_{d1}\ u_{q1}]$. In the foregoing equation, $u_{d1}$ is a d-axis modulating voltage of the GFL passivity-based feedback control law $u_1$, and $u_{q1}$ is a q-axis modulating voltage of the GFL passivity-based feedback control law $u_1$.

The PCH model based on the dissipativity and passivity theories can refer to the prior art.

The GFL passivity-based feedback control law $u_1$ is solved as follows:

In a GFL operating mode, a given value of the d-axis component and a given value of the q-axis component of the output current of the bridge arm-side inductor are respectively labeled as i*dL, i*qL that are calculated by:

$$i^*_{dL} = \frac{P_{ref}}{1.5U}$$

$$i^*_{qL} = \frac{Q_{ref}}{1.5U}$$

In the foregoing equation, $Q_{ref}$ is an instruction value of a rated reactive power output by the GCI, and U is an effective value of a voltage of the three-phase grid.

Based on the IDA-PBC method, the GFL passivity-based feedback control law $u_1 = [u_{d1}\ u_{q1}]$ is expressed by:

$$\begin{cases} u_{d1} = u_{Cd} + r_f i_d - r_{L1}(i_d - i_{dL}^*) - \omega L_1 i_{qL}^* + L_1 \dfrac{di_{dL}^*}{dt} \\ u_{q1} = u_{Cq} + r_f i_q - r_{L1}(i_q - i_{qL}^*) - \omega L_1 i_{dL}^* + L_1 \dfrac{di_{qL}^*}{dt} \end{cases}$$

In the foregoing equation, $r_f$ is the resistance of the equivalent resistor of the bridge arm-side inductor, $r_{L1}$ is an injection damping gain of the GFL mode, and $L_1$ is the inductance of the bridge arm-side inductor.

In an example of the present disclosure, the injection damping gain $r_{L1}$ of the GFL mode is 2.

Figure 4:
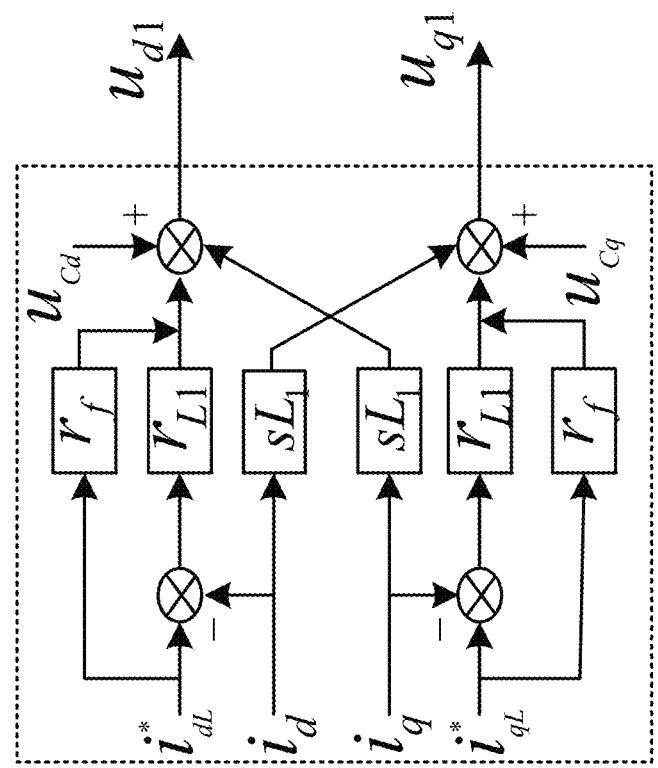
FIG. 4 is a schematic view of a PBC structure of a GFL control mode according to the present disclosure.

FIG. 4 is a schematic view of a PBC structure of a GFL control mode according to the present disclosure.

Step 4: With the PCH model based on the dissipativity and passivity theories, and the IDA-PBC method, the passivity-based feedback control law for the GFM control mode of the GCI is established, and labeled as GFM passivity-based feedback control law $u_2$, $u_2 = [u_{d2} \; u_{q2}]$. In the foregoing equation, $u_{d2}$ is a d-axis modulating voltage of the GFM passivity-based feedback control law $u_2$, and $u_{q2}$ is a q-axis modulating voltage of the GFM passivity-based feedback control law $u_2$.

The GFM passivity-based feedback control law $u_2$ is solved as follows:

In a GFM operating mode, a given value of the d-axis component and a given value of the q-axis component of the output current of the bridge arm-side inductor are respectively labeled as $i^*_{dm}$, $i^*_{qm}$ that are expressed by:

$$\begin{cases} i_{dm}^* = i_{gd} - \omega C u_{Cq} - r_{m1}(u_{Cd} - u_{Cd}^*) + C \dfrac{du_{Cd}^*}{dt} \\ i_{qm}^* = i_{gq} - \omega C u_{Cd} - r_{m1}(u_{Cq} - u_{Cq}^*) + C \dfrac{du_{Cq}^*}{dt} \end{cases}$$

In the foregoing equation, C is the capacitance of the filter capacitor, $r_{m1}$ is a first injection damping gain of the GFM mode, and $u^*_{Cd}$, $u^*_{Cq}$ are respectively a given value of the d-axis component of the output voltage of the filter capacitor and a given value of the q-axis component of the output voltage of the filter capacitor.

In an example of the present disclosure, the first injection damping gain $r_{m1}$ of the GFM mode is 0.3.

Based on the IDA-PBC method, the GFM passivity-based feedback control law $u_2 = [u_{d2} \; u_{q2}]$ is expressed by:

$$\begin{cases} u_{d2} = u_{Cd}^* - r_{m2}(i_d - i_{dm}^*) + r_f i_d - \omega L_1 i_q + L_1 \dfrac{di_{dm}^*}{dt} \\ u_{q2} = u_{Cq}^* - r_{m2}(i_q - i_{qm}^*) + r_f i_q - \omega L_1 i_d + L_1 \dfrac{di_{qm}^*}{dt} \end{cases}$$

In the foregoing equation, $r_{m2}$ is a second injection damping gain of the GFM mode, $r_f$ is the resistance of the equivalent resistor of the bridge arm-side inductor, and $L_1$ is the inductance of the bridge arm-side inductor.

In an example of the present disclosure, the second injection damping gain $r_{m2}$ of the GFM mode is 5.

Figure 5:
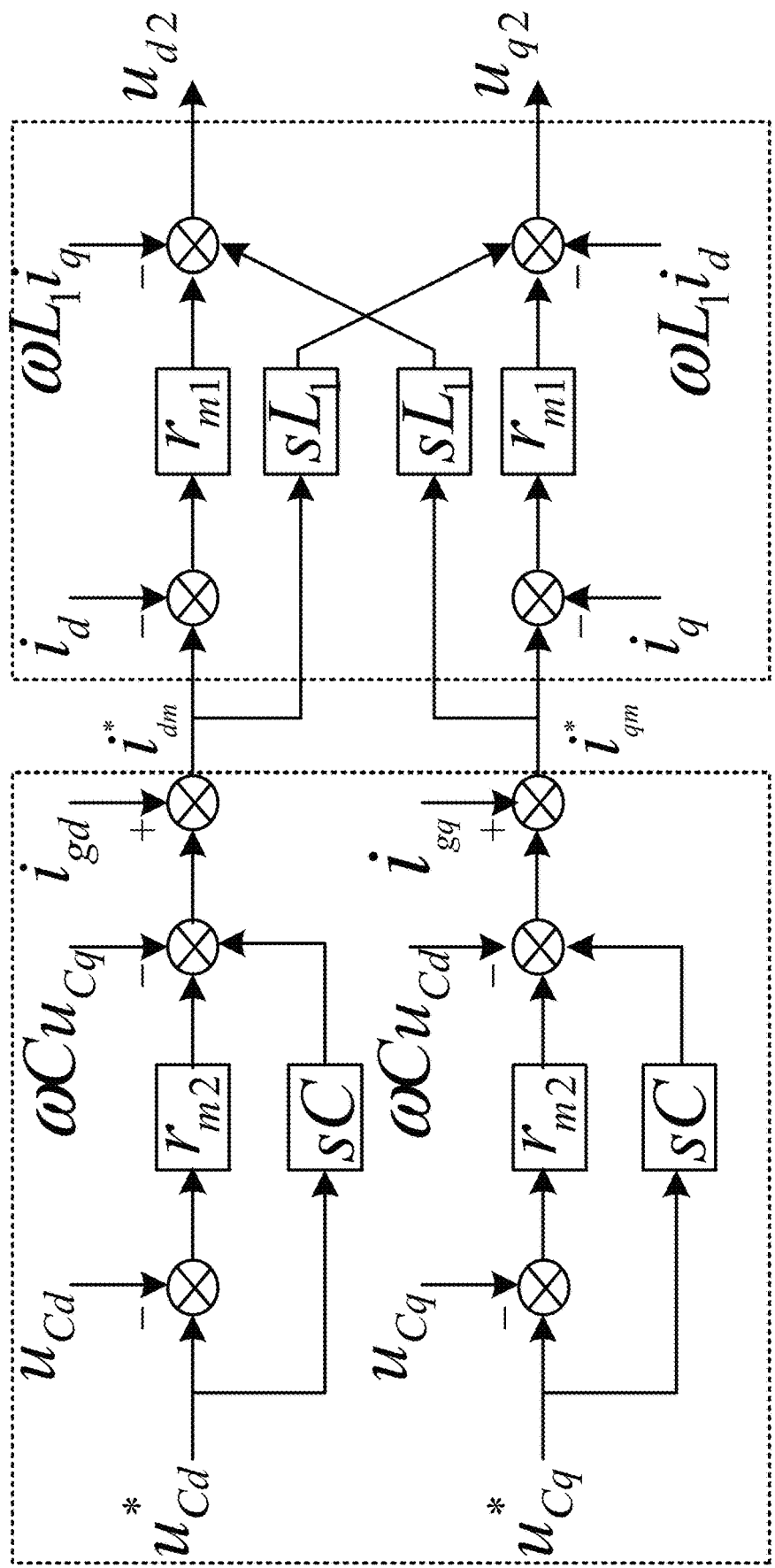
FIG. 5 is a schematic view of a PBC structure of a GFM control mode according to the present disclosure.

FIG. 5 is a schematic view of a PBC structure of a GFM control mode according to the present disclosure.

Step 5: The weighting coefficient n is introduced to realize weighted control on the GFL passivity-based feedback control law $u_1$ and the GFM passivity-based feedback control law $u_2$, and a weighted passivity-based feedback control law is labeled as the dual-mode integrated passivity-based feedback control law u that is expressed by:

$$u = nu_1 + (1-n)u_2.$$

Figure 6:
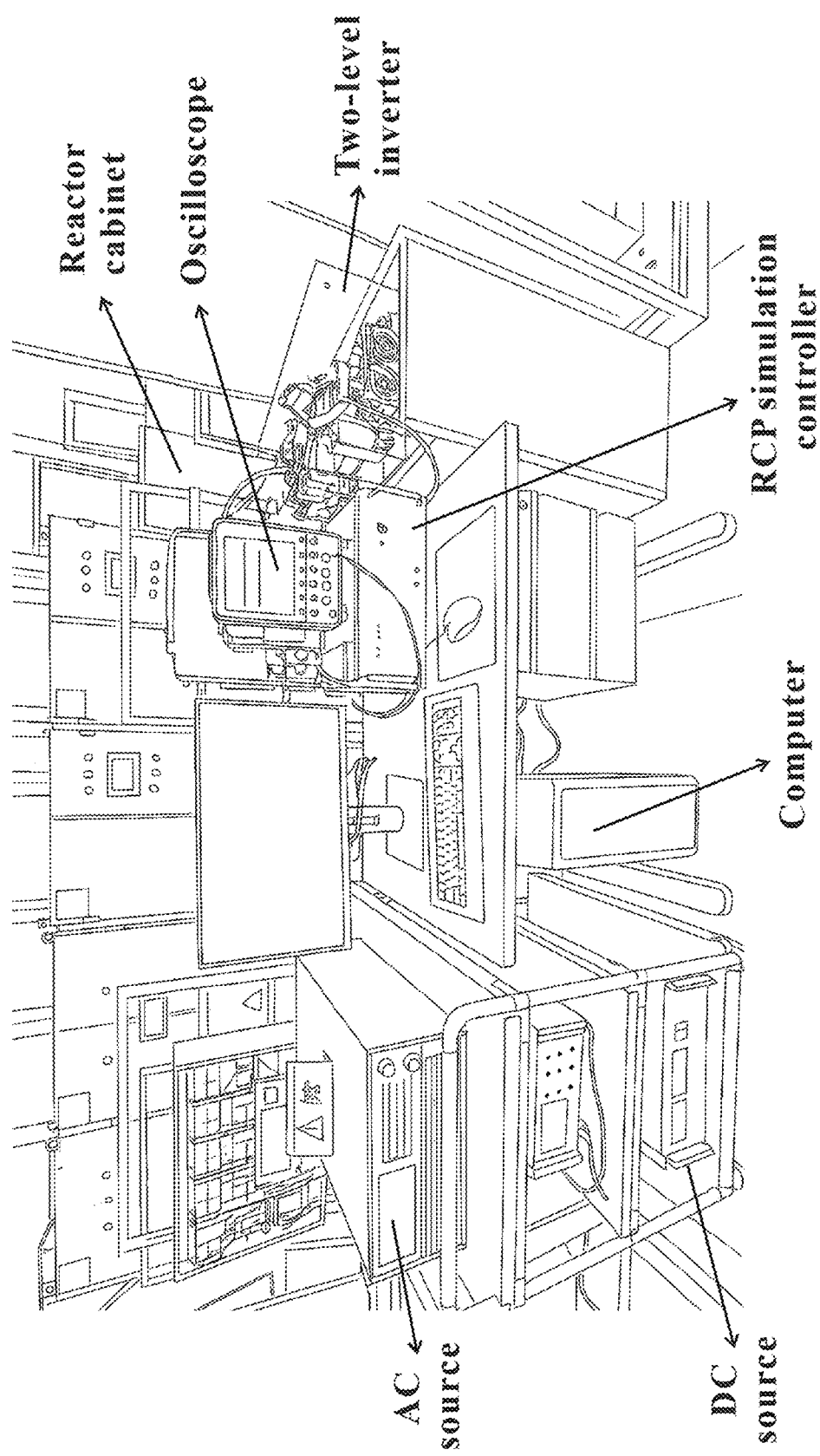
FIG. 6 illustrates an experimental device put up in a laboratory and based on a single GCI.

In an example of the present disclosure, the weighting coefficient is n=0.5. A single GCI controlled by the dual-mode integrated passivity-based feedback control law shown in FIG. 1 is used for physical simulation verification. FIG. 6 illustrates an experimental device put up in a laboratory and based on a single GCI. As can be seen from the figure, the experimental device includes a DC source (for acquiring a DC voltage required by the experiment), an AC source (for simulating the actual three-phase AC grid), a computer, a two-level inverter having a rated power of 20 kW, a rapid control prototyping (RCP) simulation controller, a reactor cabinet (for switching and simulating an inductance at different SCRs), and an oscilloscope (for recording a waveform).

The RCP simulation controller includes a microprocessor and a memory that are connected to each other. The microprocessor is programmed or configured to execute the steps of the passivity-based dual-mode integrated control method for a GCI, to realize fast and real-time control on the GCI. The memory includes a computer-readable storage medium. A computer program programmed or configured to execute the passivity-based dual-mode integrated control method for a GCI is stored in the computer-readable storage medium.

Figure 7:
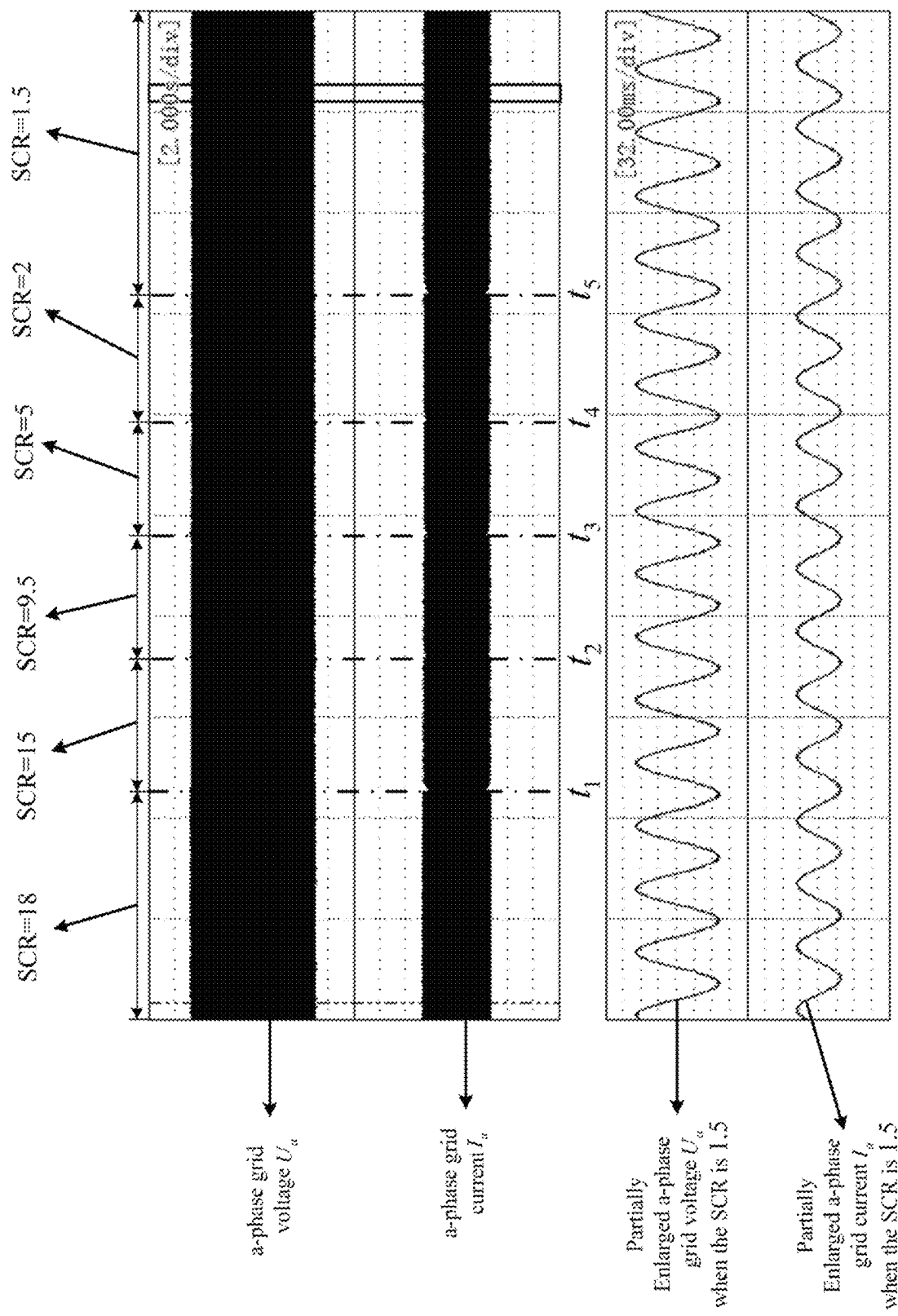
FIG. 7 illustrates an experimental waveform of an a-phase grid voltage and an experimental waveform of an a-phase grid current when a single GCI based on dual-mode integrated control operates at an SCR of 18 to 1.5.

In the experiment, the large fluctuation of the grid impedance is simulated by switching the inductance of the reactor cabinet, and the large fluctuation of the grid impedance is evaluated by the SCR. It is assumed that the GCI initially operates in a strong grid at the SCR of 18. The inductance of 2.63 mH, the inductance of 4.12 mH, the inductance of 6.16 mH, the inductance of 15.41 mH and the inductance of 7.71 mH are respectively connected to the grid side at time $t_1$, time $t_2$, time $t_3$, time $t_4$ and time $t_5$, such that the SCR is reduced to 15 from 18 to 9.5, to 5, to 2, and to 1.5. FIG. 7 illustrates an experimental waveform of an a-phase grid voltage and an experimental waveform of an a-phase grid current when a single GCI based on dual-mode integrated control operates at an SCR of 18 to 1.5. In the figure, $U_a$ is the a-phase grid voltage, and $I_a$ is the a-phase grid current. As can be seen from FIG. 7, with the large fluctuation of the grid impedance, the waveform of the a-phase grid voltage and the waveform of the a-phase grid current remain desirable. This verifies that the control strategy can be adapted to scenarios with a large fluctuation of the grid impedance from the strong grid to the weak grid.

The SCR is calculated by:

$$SCR = \dfrac{3U^2}{ZS_B}.$$

In the foregoing equation, U is an effective value of the voltage of the three-phase grid, Z is an amplitude of the grid impedance, and $S_B$ is a short-circuit capacity.

Control group: A single GCI controlled by a PI controller-based single GFM mode is used for the control test. For the control group, the coefficient $K_{p1}$ of proportionality in the control of the active power-synchronization loop is 0.0005, the coefficient $K_{pu}$ of proportionality of the voltage loop is 0.05, and the integral coefficient $K_{iu}$ of the voltage loop is 120. The coefficient $K_{pi}$ of proportionality of the current loop is 4, and the integral coefficient $K_{ii}$ of the current loop is 10.

Figure 8:
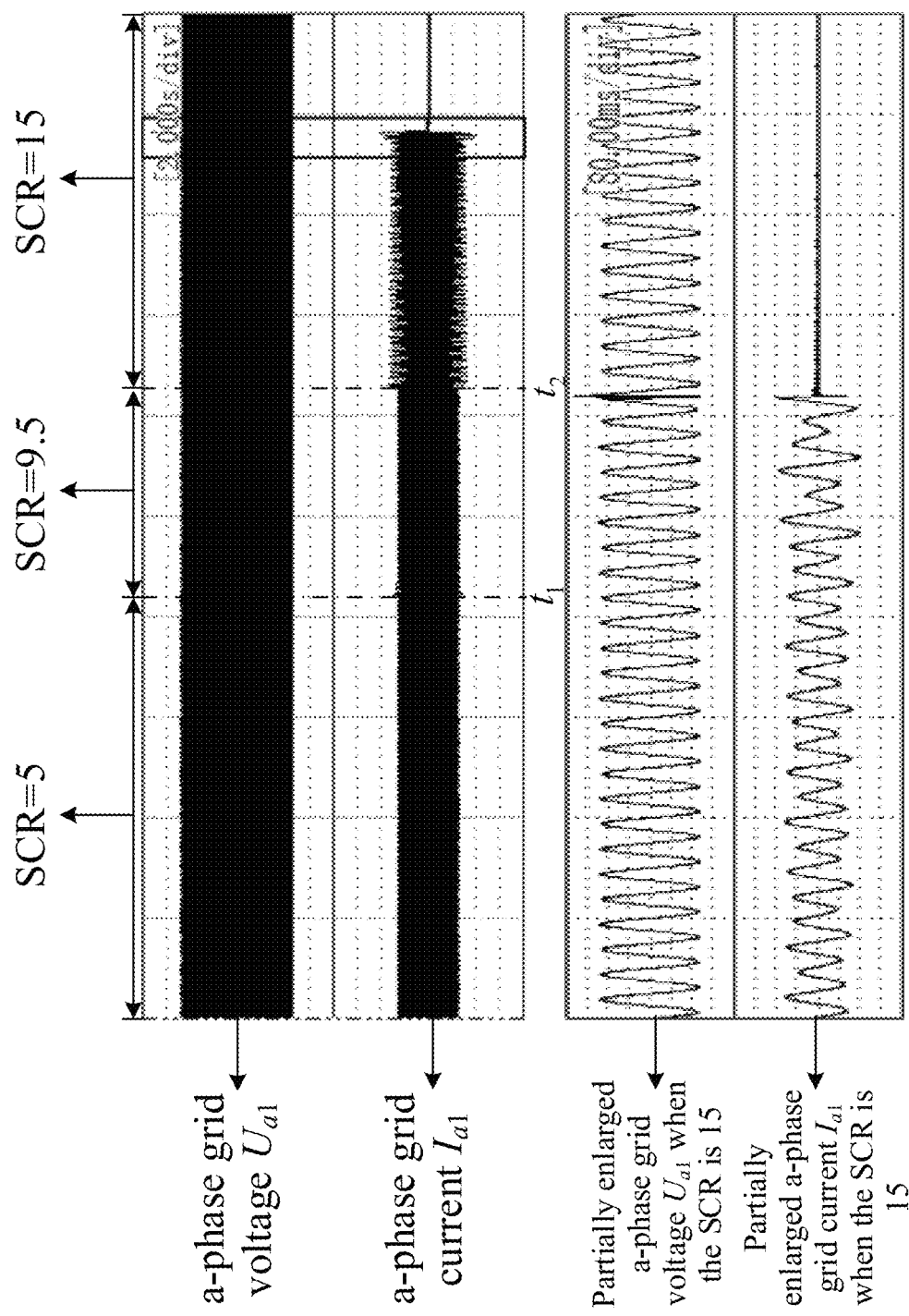
FIG. 8 illustrates an experimental waveform of an a-phase grid voltage and an experimental waveform of an a-phase grid current when a single GCI controlled by a PI controller-based single GFM mode operates at an SCR of 5 to 15.

The change of the SCR is simulated in the same method. It is assumed that the GCI initially operates at the SCR of 5. The inductance of 6.16 mH and the inductance of 4.12 mH are respectively cut at time $t_1$ and time $t_2$, such that the SCR is increased to 9.5 from 5, and to 15. FIG. 8 illustrates an experimental waveform of an a-phase grid voltage and an experimental waveform of an a-phase grid current when a single GCI controlled by the PI controller-based single GFM mode operates at an SCR of 5 to 15. In the figure, $U_{a1}$ is the a-phase grid voltage, and $I_{a1}$ is the a-phase grid current. As can be seen from FIG. 8, with the reduction of the grid impedance, the grid strength is gradually increased to form a strong grid environment. The a-phase grid voltage and the a-phase grid current show obvious oscillation. This indicates that the single control mode is hardly adapted to the large fluctuation of the grid impedance, and also further verifies the advantages of the dual-mode integrated passivity-based feedback control.

What is claimed is:

1. A passivity-based dual-mode integrated control method for a grid-connected inverter (GCI), wherein a topology of the GCI comprises a direct current (DC) power supply, a main inverter, an LCL filter, an equivalent line inductor, and a three-phase grid, wherein the DC power supply, the main inverter, the LCL filter, the equivalent line inductor, and the three-phase grid are connected serially in sequence; the LCL filter comprises a bridge arm-side inductor, an equivalent resistor of the bridge arm-side inductor, a filter capacitor, and a grid-side inductor; wherein the passivity-based dual-mode integrated control method comprises an integrated control of a grid-following (GFL) control mode of the GCI and a grid-forming (GFM) control mode of the GCI; and the passivity-based dual-mode integrated control method comprises: establishing a passivity-based feedback control law for the GFL control mode of the GCI and a passivity-based feedback control law for the GFM control mode of the GCI; and introducing a weighting coefficient n to weight the two passivity-based feedback control laws of the two control modes, thereby obtaining a dual-mode integrated passivity-based feedback control law u, further comprising:

step 1: sampling an output current $i_a$, $i_b$, $i_c$ of the bridge arm-side inductor, and transforming the output current from a three-phase stationary coordinate system to a two-phase rotating coordinate system to obtain a d-axis component $i_d$ of the output current of the bridge arm-side inductor and a q-axis component $i_q$ of the output current of the bridge arm-side inductor; sampling an output voltage $u_{Ca}$, $u_{Cb}$, $u_{Cc}$ of the filter capacitor, and transforming the output voltage from the three-phase stationary coordinate system to the two-phase rotating coordinate system to obtain a d-axis component $u_{Cd}$ of the output voltage of the filter capacitor and a q-axis component $u_{Cq}$ of the output voltage of the filter capacitor; and sampling a current $i_{ga}$, $i_{gb}$, $i_{gc}$ of the three-phase grid, and transforming the current from the three-phase stationary coordinate system to the two-phase rotating coordinate system to obtain a d-axis component $i_{gd}$ of the current of the three-phase grid and a q-axis component $i_{gq}$ of the current of the three-phase grid;

step 2: acquiring a phase angle required by synchronization of the GCI and the three-phase grid, and labeling the phase angle as a synchronous phase angle θ, $\theta=\int\omega dt$, wherein t is operation time of the GCI, and ω is a referenced angular frequency; and the referenced angular frequency ω is obtained through control of an active power-synchronization loop, and expressed by: $\omega=\omega_0+K_p(P_{ref}-P)$, wherein $\omega_0$ is a rated angular frequency, $K_p$ is a coefficient of proportionality in the control of the active power-synchronization loop, $P_{ref}$ is an instruction value of a rated active power output by the GCI, and P is the rated active power output by the GCI;

step 3: establishing the passivity-based feedback control law for the GFL control mode of the GCI, and labeling the passivity-based feedback control law for the GFL control mode of the GCI as a GFL passivity-based feedback control law $u_1$, $u_1=[u_{d1}\ u_{q1}]$, wherein $u_{d1}$ is a d-axis modulating voltage of the GFL passivity-based feedback control law $u_1$, and $u_{q1}$ is a q-axis modulating voltage of the GFL passivity-based feedback control law $u_1$; and the GFL passivity-based feedback control law $u_1$ is solved as follows:

in a GFL operating mode, respectively labeling a given value of the d-axis component $i^*_{dL}$ and a given value of the q-axis component of the output current of the bridge arm-side inductor as $i^*_{qL}$, wherein $i^*_{dL}$, $i^*_{qL}$ are calculated by:

$$i^*_{dL} = \frac{P_{ref}}{1.5U}$$

$$i^*_{qL} = \frac{Q_{ref}}{1.5U}$$

wherein $Q_{ref}$ is an instruction value of a rated reactive power output by the GCI, and U is an effective value of a voltage of the three-phase grid; and based on an interconnection and damping assignment passivity-based control (IDA-PBC) method, expressing the GFL passivity-based feedback control law $u_1=[u_{d1}\ u_{q1}]$ by:

$$\begin{cases} u_{d1} = u_{Cd} + r_f i_d - r_{L1}(i_d - i^*_{dL}) - \omega L_1 i^*_{qL} + L_1 \frac{di^*_{dL}}{dt} \\ u_{q1} = u_{Cq} + r_f i_q - r_{L1}(i_q - i^*_{qL}) - \omega L_1 i^*_{dL} + L_1 \frac{di^*_{qL}}{dt} \end{cases}$$

wherein $r_f$ is a resistance of the equivalent resistor of the bridge arm-side inductor, $r_{L1}$ is an injection damping gain of the GFL control mode, and $L_1$ is an inductance of the bridge arm-side inductor;

step 4: establishing the passivity-based feedback control law for the GFM control mode of the GCI, and labeling the passivity-based feedback control law for the GFM control mode of the GCI as a GFM passivity-based feedback control law $u_2$, $u_2=[u_{d2}\ u_{q2}]$, wherein $u_{d2}$ is a d-axis modulating voltage of the GFM passivity-based feedback control law $u_2$, and $u_{q2}$ is a q-axis modulating voltage of the GFM passivity-based feedback control law $u_2$; and the GFM passivity-based feedback control law $u_2$ is solved as follows:

in a GFM operating mode, respectively labeling a given value of the d-axis component $i^*_{dm}$ and a given value of the q-axis component of the output current of the bridge arm-side inductor as $i^*_{qm}$, wherein $i^*_{dm}$, $i^*_{qm}$ are expressed by:

$$\begin{cases} i^*_{dm} = i_{gd} - \omega C u_{Cq} - r_{m1}(u_{Cd} - u^*_{Cd}) + C\dfrac{du^*_{Cd}}{dt} \\ i^*_{qm} = i_{gq} - \omega C u_{Cd} - r_{m1}(u_{Cq} - u^*_{Cq}) + C\dfrac{du^*_{Cq}}{dt} \end{cases}$$

wherein C is a capacitance of the filter capacitor, $r_{m1}$ is a first injection damping gain of the GFM control mode, and $u^*_{Cd}$, $u^*_{Cq}$ are respectively a given value of the d-axis component of the output voltage of the filter capacitor and a given value of the q-axis component of the output voltage of the filter capacitor; and based on the IDA-PBC method, expressing the GFM passivity-based feedback control law $u_2 = [u_{d2}\ u_{q2}]$ by:

$$\begin{cases} u_{d2} = u^*_{Cd} - r_{m2}(i_d - i^*_{dm}) + r_f i_d - \omega L_1 i_q + L_1 \dfrac{di^*_{dm}}{dt} \\ u_{q2} = u^*_{Cq} - r_{m2}(i_q - i^*_{qm}) + r_f i_q - \omega L_1 i_d + L_i \dfrac{di^*_{qm}}{dt} \end{cases}$$

wherein $r_{m2}$ is a second injection damping gain of the GFM mode, $r_f$ is the resistance of the equivalent resistor of the bridge arm-side inductor, and $L_1$ is the inductance of the bridge arm-side inductor; and step 5: introducing the weighting coefficient n to realize weighted control on the GFL passivity-based feedback control law $u_1$ and the GFM passivity-based feedback control law $u_2$, and labeling a weighted passivity-based feedback control law as the dual-mode integrated passivity-based feedback control law u, wherein the dual-mode integrated passivity-based feedback control law u is expressed by:

$$u = nu_1 + (1-n)u_2.$$

* * * * *